(12) United States Patent
Lin

(10) Patent No.: US 9,143,596 B2
(45) Date of Patent: Sep. 22, 2015

(54) VOICE COMMUNICATION APPARATUS

(71) Applicant: Wistron Corporation, New Taipei (TW)

(72) Inventor: Ko-Cheng Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/151,819

(22) Filed: Jan. 10, 2014

(65) Prior Publication Data

US 2015/0099484 A1     Apr. 9, 2015

(30) Foreign Application Priority Data

Oct. 4, 2013    (TW) .............................. 102136048 A

(51) Int. Cl.
*H04M 1/68*     (2006.01)
*H04M 1/60*     (2006.01)

(52) U.S. Cl.
CPC .............. *H04M 1/68* (2013.01); *H04M 1/6058* (2013.01)

(58) Field of Classification Search
CPC ... H04M 19/045; H04W 12/02; H04W 12/04; H04W 12/06; H04W 12/08; H04W 12/10; H04W 12/12
See application file for complete search history.

(56) References Cited

FOREIGN PATENT DOCUMENTS

WO     WO 0072555 A1 * 11/2000

* cited by examiner

*Primary Examiner* — Kashif Siddiqui
(74) *Attorney, Agent, or Firm* — Jianq Chyun IP Office

(57) ABSTRACT

A voice communication apparatus is provided. The voice communication apparatus includes a control unit, a hand-held voice transceiver, a position status detector, a first switch and a one-way signal transmitter. The position status detector generates status information by detecting a position status of the hand-held voice transceiver. The first switch turns on or cuts off a connection path between the hand-held voice transceiver and the control unit according to the status information. The one-way signal transmitter is coupled between the position status detector and the control unit, and transmits the status information to the control unit.

14 Claims, 3 Drawing Sheets

VOICE COMMUNICATION APPARATUS

CROSS-REFERENCE TO RELATED APPLICATION

This application claims the priority benefit of Taiwan application serial no. 102136048, filed on Oct. 4, 2013. The entirety of the above-mentioned patent application is hereby incorporated by reference herein and made a part of this specification.

BACKGROUND OF THE INVENTION

1. Field of the Invention

The invention relates to a voice communication apparatus, and more particularly to a voice communication apparatus that may prevent eavesdropping activities.

2. Description of Related Art

With advancement of Internet technique, a type of Internet phone that enables communication through the Internet is launched. Currently, in the known technical fields, the voice channels provided by the Internet phone can be roughly categorized into three types including the handset, earphone, and hand-free. Generally speaking, a processor necessary for executing a software program to change the value of a register in a voice chip for the Internet phone to turn off the channel. However, in the Net-generation, a hacker or someone with bad intentions usually takes advantage of a virus program or backdoor program to open the voice channel that is initially closed when the Internet phone is not operating to invade people's privacy or steal trade secrets via eavesdropping. For that reason, how to configure a mechanism on the Internet phones for preventing eavesdropping becomes an urgent issue for designers in the field.

SUMMARY OF THE INVENTION

The invention provides a voice communication apparatus which may effectively prevent eavesdropping.

In the invention, the voice communication apparatus includes a control unit, a hand-held voice transceiver, a position status detector, a first switch, and a one-way signal transmitter. The position status detector is coupled to the hand-held voice transceiver, generating status information according to the position status of the hand-held voice transmitter. The first switch is coupled between the hand-held voice transceiver and the control unit, turning on or cutting off a connection path between the hand-held voice transceiver and the control unit according to the status information. The one-way signal transmitter is coupled between the position status detector and control unit, transmitting status information to the control unit in one way.

In an embodiment of the invention, the voice communication apparatus further includes at least a voice transceiver, at least a second switch, and at least an alarm signal generator. The second switch is coupled between the voice transceiver and the control unit; the second switch receives a control signal transmitted by the control unit so as to be turned on or cut off according to the control signal. The alarm signal generator is coupled to the control unit to transmit an alarm signal according to the control signal.

In an embodiment of the invention, at least one aforementioned second switch has a first terminal, a second terminal, a third terminal, and a fourth terminal. The first terminal is coupled to the voice transceiver; the second terminal floats, and the fourth terminal is coupled to the control unit. At least a second switch further includes a buffer. An input terminal of the buffer is coupled to the third terminal to receive the control signal, wherein the second switch determines whether the fourth terminal is coupled to the first terminal or the second terminal according to an output of the buffer.

In an embodiment of the invention, at least one aforementioned second switch has a first terminal, a second terminal, a third terminal, and a fourth terminal. The first terminal is coupled to the voice transceiver; the third terminal floats, and the fourth terminal is coupled to the control unit. At least a second switch further includes a first buffer, a second buffer, a first transmitting gate, and a second transmitting gate. An input terminal of the first buffer is coupled to the second terminal so as to receive the control signal. An input terminal of the second buffer is coupled to an output terminal of the first buffer. The first transmitting gate is connected in series between the first terminal and the fourth terminal. A first control terminal of the first transmitting gate is coupled to an output terminal of the first buffer; a second control terminal of the first transmitting gate is coupled to an output terminal of the second buffer. The second transmitting gate is connected in series between the third terminal and the fourth terminal. The first control terminal of the second transmitting gate is coupled to an output terminal of the second buffer; a second control terminal of the second transmitting gate is coupled to an output terminal of the first buffer.

In an embodiment of the invention, the aforementioned voice transceiver includes a headset microphone and a hand-free microphone.

In an embodiment of the invention, the alarm signal generator includes a first alarm signal generator corresponding to the headset microphone and a second alarm signal generator corresponding to the hand-free microphone.

In an embodiment of the invention, the aforementioned first alarm signal generator is a first light emitting diode and/or a first buzzer. The second alarm signal generator is a second light emitting diode and/or a second buzzer.

In an embodiment of the invention, the aforementioned control unit includes a central processing unit and a voice codec. The central processing unit is coupled to the one-way signal transmitter so as to receive the status information. The voice codec is coupled to the central processing unit and the first switch.

In an embodiment of the invention, the aforementioned voice codec receives a voice signal via the first switch and codes the voice signal so as to generate a coded voice signal.

In an embodiment of the invention, the aforementioned coded voice signal is a pulse code modulation voice signal.

In an embodiment of the invention, the aforementioned position status detector is a hook type switch.

In an embodiment of the invention, the aforementioned one-way signal transmitter is a diode. An anode of the diode is coupled to the position status detector; a cathode of the diode is coupled to the control unit.

In an embodiment of the invention, the aforementioned first switch has a first terminal, a second terminal, a third terminal, and a fourth terminal. The first terminal is coupled to a hand-held voice transceiver; a second terminal floats; and the fourth terminal is coupled to the control unit. The first switch further includes a buffer. An input terminal of the buffer is coupled to the third terminal so as to receive the status information, wherein the second switch determines whether the fourth terminal is coupled to the first terminal or the second terminal according to an output of the second buffer.

In an embodiment of the invention, the aforementioned first switch has a first terminal, a second terminal, a third terminal, and a fourth terminal. The first terminal is coupled to the hand-held voice transceiver; the third terminal floats; and the fourth terminal is coupled to the control unit. The first switch further includes a first buffer, a second buffer, a first transmitting gate, and a second transmitting gate. An input terminal of the first buffer is coupled to the second terminal so as to receive the status information; an input terminal of the second buffer is coupled to an output terminal of the first buffer. The first transmitting gate is connected in series between the first terminal and the fourth terminal. A first control terminal of the first transmitting gate is coupled to an output terminal of the first buffer; the second control terminal of the first transmitting gate is coupled to an output terminal of the second buffer. The second transmitting gate is connected in series between the third terminal and the fourth terminal; the first control terminal of the second transmitting gate is coupled to an output terminal of the second buffer; the second control terminal of the second transmitting gate is coupled to an output terminal of the first buffer.

Based on the above, in the invention, through configuring a switch between the voice transceiver and the control unit to control the transmitting status of the voice signal transmitting channel and through controlling the on/off status of the switch, the eavesdropping conducted via a voice communication apparatus may be prevented. In the embodiments of the invention, one may know whether there is a hacker using the voice communication apparatus to conduct eavesdropping through detecting the on or off status of the switch, and based on which an alarm signal is sent so as to effectively avoid the possibility of being eavesdropped.

In order to make the aforementioned features and advantages of the invention more comprehensible, embodiments accompanying figures are described in detail below.

DESCRIPTION OF EMBODIMENTS

Figure 1:
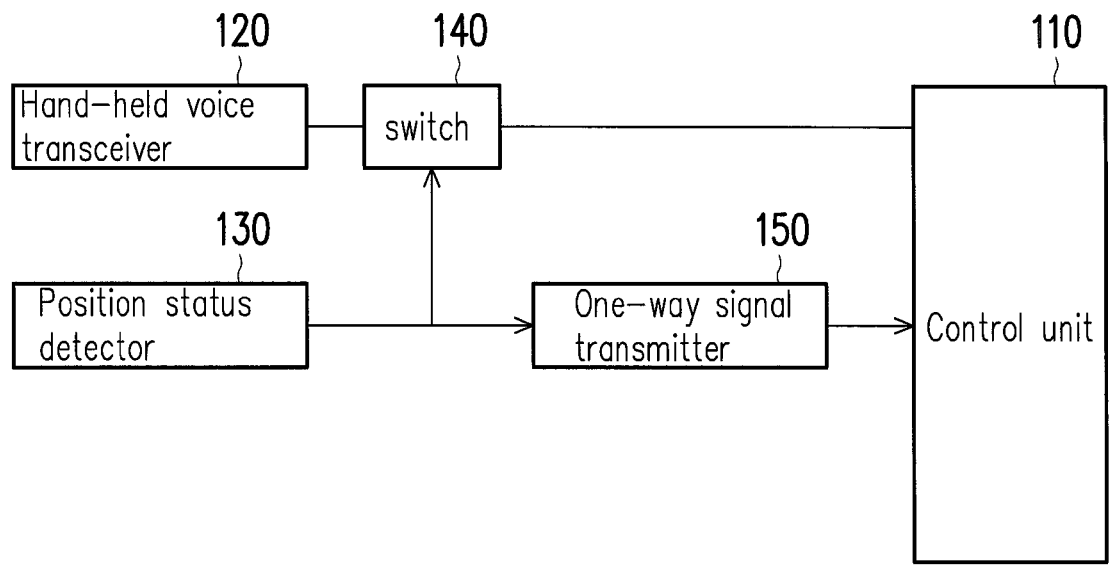
FIG. 1 is a schematic view illustrating a voice communication apparatus 100 according to an embodiment of the invention.

Please refer to FIG. 1. FIG. 1 is a schematic view illustrating a voice communication apparatus 100 according to an embodiment of the invention. In FIG. 1, the voice communication apparatus 100 includes a control unit 110, a hand-held voice transceiver 120, a position status detector 130, a switch 140, and a one-way signal transceiver 150. The control unit 110 controls the overall actuation of the voice communication apparatus 100. In the embodiment, the voice communication apparatus 100 conducts communication via the Internet. In other words, the control unit 110 may transmit or receive a plurality of information via the Internet. The hand-held voice transceiver 120 is, for example, a handset of a telephone to be held by a user for communication. The hand-held voice transceiver 120 may receive the user's voice and transmit the same to the control unit 110 to perform coding to the voice signal. The control unit 110 may transmit the coded voice signal. In addition, the hand-held voice transceiver 120 may further include a speaker that transmits voice for transmitting the voice signal from a remote end to the user's ears.

The position status detector 130 is disposed in the voice communication apparatus 100 and coupled to the hand-held voice transceiver 120. The position status detector 130 generates status information according to the position status of the hand-held voice transceiver 120. Specifically, the position status detector 130 may be a hook type switch, and by which the generated status information may indicate whether the hand-held voice transceiver 120 is hung on the position status detector 130. That is to say, when the status information indicates that the hand-held voice transceiver 120 is hung on the position status detector 130, it means that the hand-held voice transceiver 120 is not operating. Relatively, when the status information indicates that the hand-held voice transceiver 120 is not hung on the position status detector 130, it means that the user is holding the hand-held voice transceiver 120 and using the hand-held voice transceiver 120 for communication.

The switch 140 is coupled between the hand-held voice transceiver 120 and the control unit 110. The switch 140 receives the status information transmitted by the position status detector 130 to turn on or cut off a connection path between the hand-held voice transceiver 120 and the control unit 110 according to the status information. Please note that, when the hand-held voice transceiver 120 is hung on the position status detector 130, the position status detector 130 transmits corresponding status information and makes the switch 140 cut off the connection path between the hand-held voice transceiver 120 and the control unit 110 according to the status information. Accordingly, when the hand-held voice transceiver 120 is not operating, the hand-held voice transceiver 120 cannot transmit the voice signal to the control unit 110. In other words, the hacker will not be able to hack in and manipulate the control unit 110 to receive the voice at where the voice communication apparatus 100 is located via the hand-held voice transceiver 120 to carry out eavesdropping.

On the other hand, when the hand-held voice transceiver 120 is held by the user, the position status detector 130 changes the transmitted status information and makes the switch 140 turn on the connection path between the hand-held voice transceiver 120 and the control unit 110 according to the status information, so that the user's voice can be transmitted to the control unit 110 via the switch 140 that is turned on for normal communication.

It should be noted that, in the embodiment, the voice communication apparatus 100 further includes a one-way signal transmitter 150 configured between the position status detector 130 and the control unit 110. The one-way signal transmitter 150 provides one-way signal transmitting function only. In FIG. 1, the one-way signal transmitter 150 may transmit the status information generated by the position status detector 130 into the control unit 110; the control unit 110 cannot transmit the signal to the switch 140 via the one-way signal transmitter 150 to control the on or off status of the switch 140. Accordingly, the switch 140 can be completely isolated from the control unit 110 without being manipulated by the hacker for carrying out eavesdropping.

Figure 2:
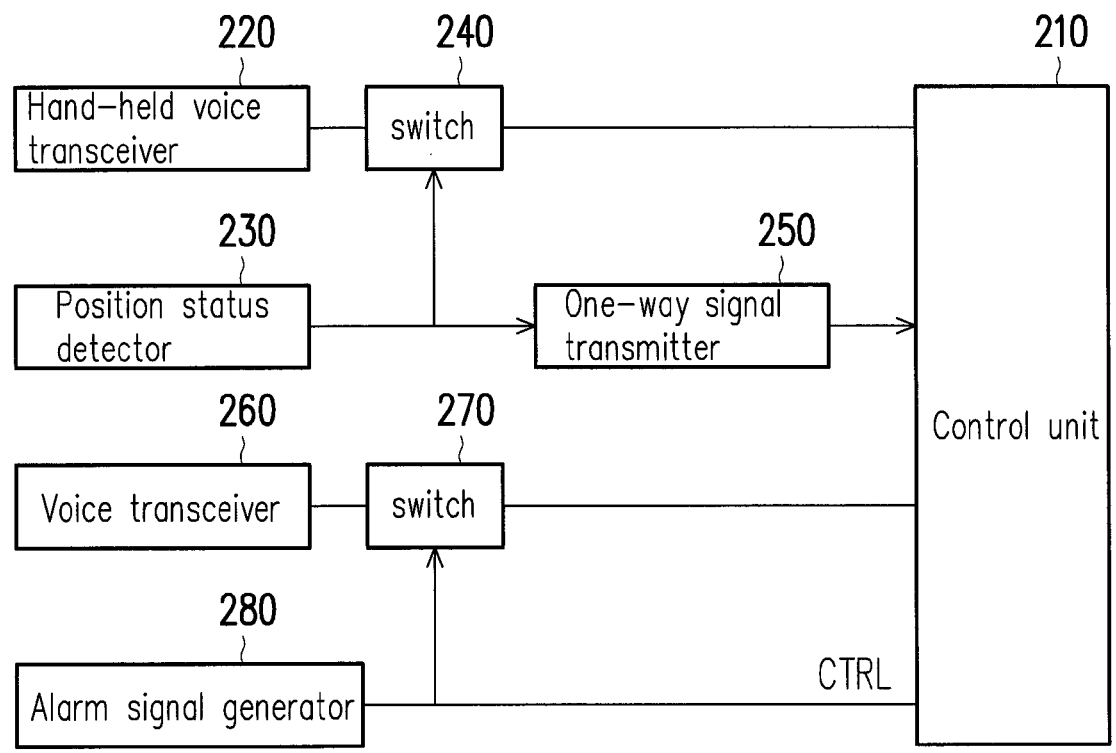
FIG. 2 is a schematic view illustrating a voice communication apparatus 200 according to another embodiment of the invention.

Please refer to FIG. 2. FIG. 2 is a schematic view illustrating a voice communication apparatus according to another embodiment of the invention. In FIG. 2, a voice communication apparatus 200 includes a control unit 210, a hand-held voice transceiver 220, a position status detector 230, switches 240 and 270, a one-way signal transmitter 250, a voice transceiver 260, and an alarm signal generator 280. The switch 270 is coupled between the voice transceiver 260 and the control unit 210. The switch 270 receives a control signal CTRL transmitted by the control unit 210 so as to be turned on or off according to the control signal CTRL.

In addition, in the embodiment, the alarm signal generator 280 is coupled to the control unit 210; moreover, the alarm signal generator 280 receives the control signal CTRL transmitted by the control unit 210. The alarm signal generator 280 determines whether to transmit an alarm signal according to the control signal CTRL. Specifically, when the switch 270 is turned on according to the control signal CTRL, the alarm signal generator 280 may simultaneously transmit an alarm signal according to the control signal CTRL. Relatively, when the switch 270 is cut off according to the control signal CTRL, the alarm signal generator 280 may not transmit the alarm signal simultaneously according to the control signal CTRL.

Please note that, in the embodiment, the voice transceiver 260 may be any element that can receive the voice signal apart from the hand-held handset configured on the voice communication apparatus 200. Moreover, the number of the voice transceiver 260 is not limited to one. A plurality of voice transceivers can equally be implemented on the voice communication apparatus in the invention. Each voice transceiver is correspondingly provided with a switch and an alarm signal generator; each alarm signal generator determines whether to generate the alarm signal according to the on or off status of the corresponding switch.

In the embodiment, once the hacker transmits the control signal CTRL via the control unit 210 to turn on the switch 270 to carry out eavesdropping, the alarm signal generator 280 will transmit the alarm signal corresponding to the on status of the switch 270 so as to notify people near the voice communication apparatus 200 that someone is probably carrying out eavesdropping via the voice communication apparatus 200. Accordingly, the hacker's eavesdropping can be stopped in time so as to prevent leak of secrets.

Figure 3:
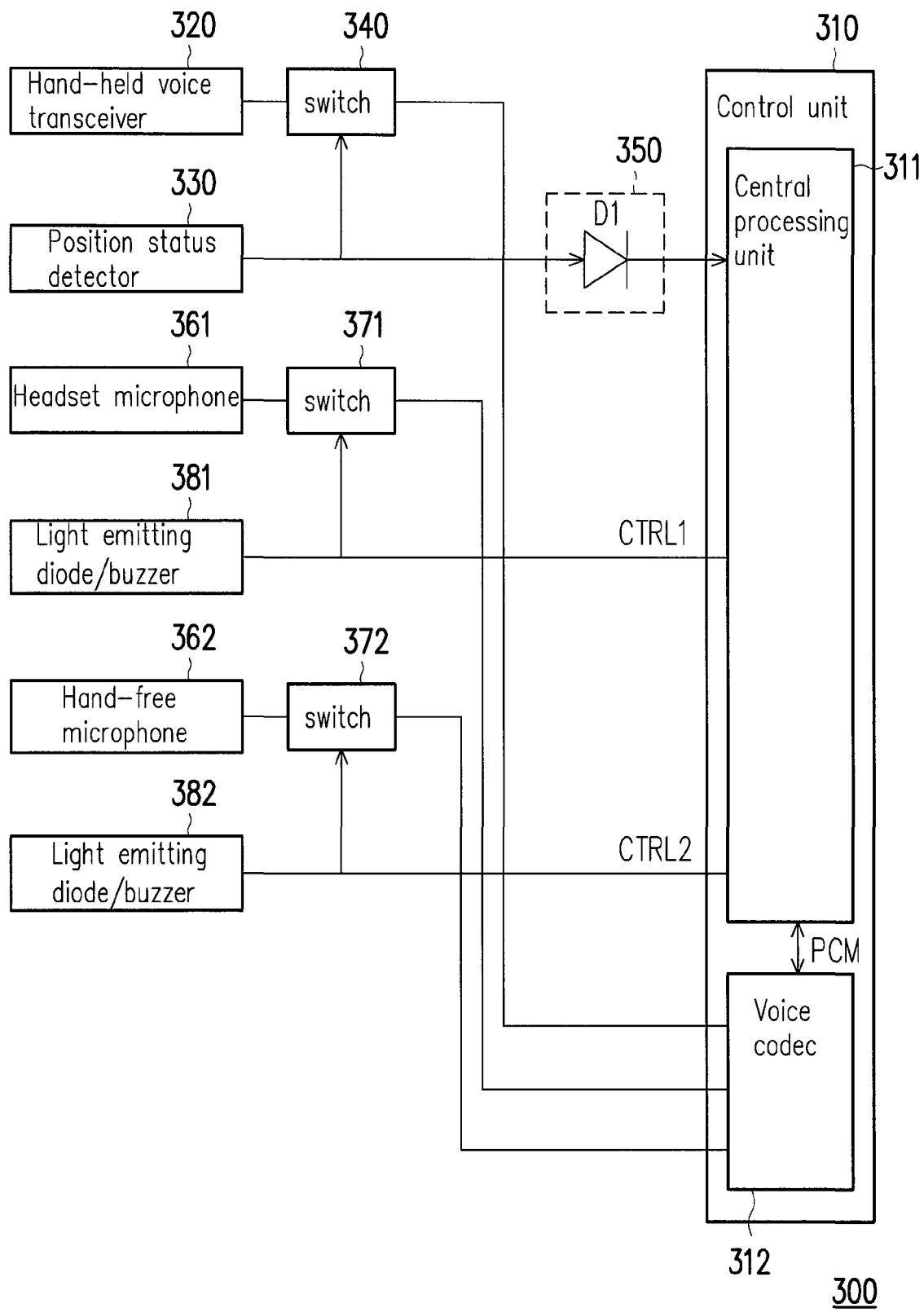
FIG. 3 is a schematic view illustrating a voice communication apparatus 300 according to another embodiment of the invention.

Please refer to FIG. 3. FIG. 3 is a schematic view illustrating a voice communication apparatus according to another embodiment of the invention. A voice communication apparatus 300 includes a control unit 310, a hand-held voice transceiver 320, a position status detector 330, switches 340, 371, 372, a one-way signal transceiver 350, a headset microphone 361, a hand-free microphone 362, a light emitting diode/buzzer 381 and 382. The control unit 310 includes a central processing unit 311 and a voice codec 312, wherein the light emitting diode/buzzer 381 and 382 are used as alarm signal generators.

The voice codec 312 may receive the voice signal via at least one of the switches 340, 371, and 372 and perform coding to the voice signal so as to generate a coded voice signal PCM, wherein the coded voice signal PCM is pulse code modulation (PCM) voice signal. Alternatively, the voice codec 312 may decode the coded voice signal PCM transmitted by the central processing unit 311 and then transmit the decoded signal.

In the embodiment, the hand-held voice transceiver 320 is coupled to the switch 340; the switch 340 is then coupled to the voice codec 312. The hand-held voice transceiver 320 may carry out voice signal transmission with the voice codec 312 via the switch 340. Meanwhile, when the switch 340 is in a cut-off state, the hand-held voice transceiver 320 may not transmit or receive the voice signal. Accordingly, with the position information provided by the position status detector 330, the switch 340 can be effectively cut off when the hand-held voice transceiver 320 is not operating so as to avoid eavesdropping.

The one-way signal transmitter 350 is constructed by a diode D1. An anode of the diode D1 is connected to the position status detector 330, and a cathode of the diode D1 is coupled to the central processing unit 311.

FIG. 3 illustrates two different voice receivers including a headset microphone 361 and a hand-free microphone 362. The headset microphone 361 is coupled to the voice codec 312 via the switch 371. The hand-free microphone 362 is coupled to the voice codec 312 via the switch 372. When the control unit 310 transmits a control signal CTRL1 to turn on the switch 371 via the central processing unit 311, the light emitting diode or buzzer 381 may transmit an alarm signal such as a light source and/or sound according to the control signal CTRL1. Likewise, when the control unit 310 transmits a control signal CTRL2 to turn on the switch 372 via the central processing unit 311, the light emitting diode/buzzer 382 may transmit an alarm signal such as a light source and/or sound according to the control signal CTRL2.

Through generation of the aforementioned alarm signal, the user will know whether at least one of the channels between the non hand-held voice receiver (such as the headset microphone 361 and hand-free microphone 362) of the voice communication apparatus 300 and the voice codec 312 is turned on for receiving sound. Accordingly, the user may also determine whether there is a hacker carrying out eavesdropping via the voice receiver so as to effectively prevent the secrets from being stolen.

Figure 4A:
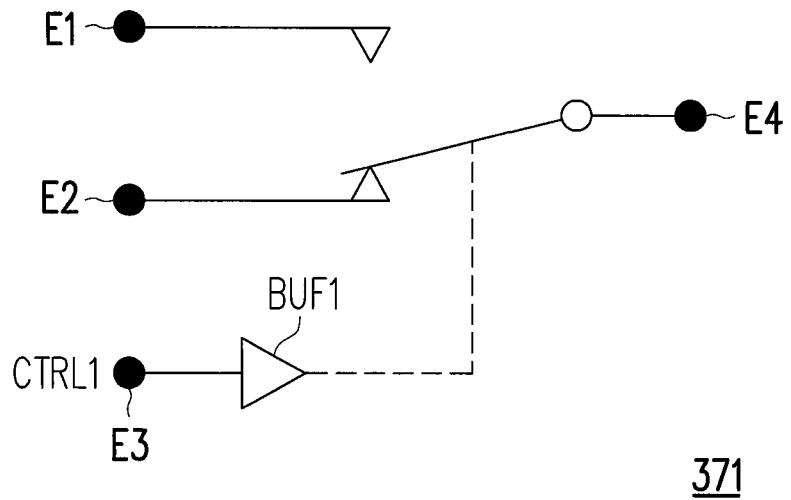
FIG. 4A and FIG. 4B are embodiments respectively illustrating different implementations for switches 340, 371, and 372 in the embodiments of the invention.
Figure 4B:
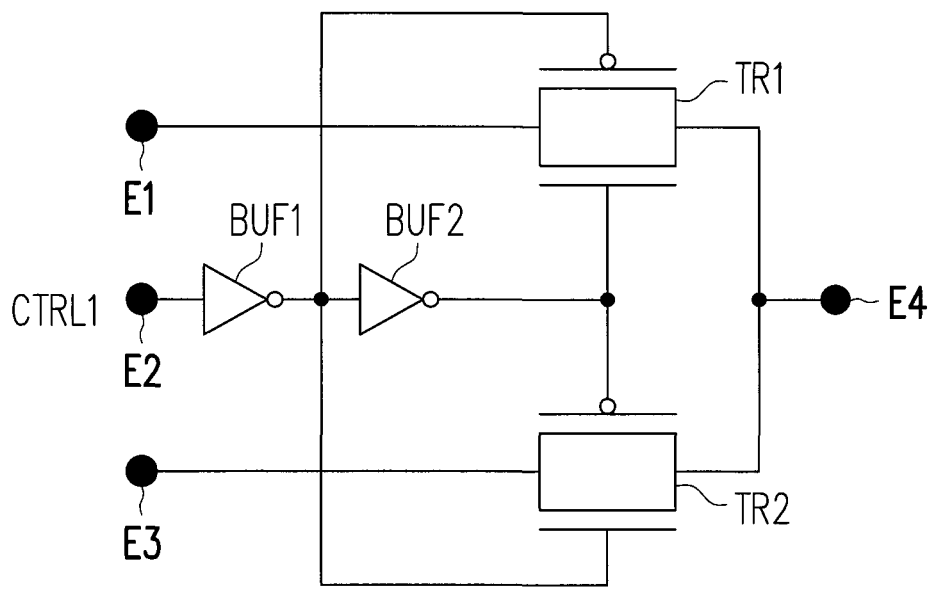

Please refer to FIGS. 3, 4A, and 4B. FIG. 4A and FIG. 4B respectively illustrate different implementations for switches 340, 371, and 372 in the embodiments of the invention. The realization of the switch 371 is provided as an example. The switch 371 in FIG. 4A has terminals E1-E4, wherein the terminal E1 may be coupled to the headset microphone 361; the terminal E4 may be coupled to a voice codec 312; the terminal E2 may be in a floating status; and the terminal E3 is coupled to the central processing unit 311 so as to receive the control signal CTRL1. The control signal CTRL1 received by the terminal E3 controls the terminal E4 to be connected to the terminal E1 or E2 via a buffer BUF1. When the terminal E4 is connected to the terminal E1, the switch 371 may be regarded as being turned on, allowing a transmitting channel between the headset microphone 361 and the voice codec 312 to be turned on. In reverse, when the terminal E4 is connected to the terminal E2, the switch 371 may be regarded as being cut off, allowing the transmitting channel between the headset microphone 361 and the voice codec 312 to be cut off.

Likewise, the realization of the switch 371 is provided as an example. In FIG. 4B, the switch 371 has terminals E1-E4 and a multiplexer formed of buffers BUF1-BUF2 as well as transmitting gates TR1 and TR2. The terminal E1 may be coupled to the headset microphone 361; the terminal E4 may be coupled to the voice codec 312; the terminal E2 may be in a floating status; and the terminal E3 is coupled to the central processing unit 311 so as to receive the control signal CTRL1. The terminal E2 receives the control signal and turns on one of the transmitting gates TR1 and TR2 via the buffers BUF1-BUF2. When the transmitting gate TR1 is turned on, the switch 371 may be regarded to be turned on, allowing the transmitting channel between the headset microphone 361 and the voice codec 312 to be turned on. In reverse, when the transmitting gate TR1 is cut off, the switch 371 may be regarded to be cut off, allowing the transmitting channel between the headset microphone 361 and the voice codec 312 to be cut off.

Certainly, the aforementioned methods may be applied to be implemented for switches 140, 240, 270, 340, 371, and 372 in a plurality of embodiments of the invention. Moreover, the switches in the embodiments of the invention are not limited to be implemented via the aforementioned methods. Any analog switch element known to persons having ordinary skill in the art may be applied for implementation of each switch in the embodiments of the invention.

Based on the above, in the invention, through configuring the switch in the voice transmitting-receiving channels and adopting the control unit 310 to control the on status of the switch 340, the eavesdropping conducted through the control unit 310 of the voice communication apparatus 300 may be prevented. In the invention, one may know whether there is a hacker carrying out eavesdropping via the voice communication apparatus 300 through detecting the on or off status of the switches 371 an 372, and an alarm signal will be transmitted according to the status so as to effectively avoid the possibility of being eavesdropped. Accordingly, eavesdropping conducted via the voice communication apparatus 300 in the invention will be eliminated so as to effectively prevent secrets from being stolen.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A voice communication apparatus, comprising:
   a control unit;
   a hand-held voice transceiver;
   a position status detector, coupled to the hand-held voice transceiver, and generating a status information according to a position status of the hand-held voice transceiver;
   a first switch, coupled between the hand-held voice transceiver and the control unit, and turning on or cutting off a connection path between the hand-held voice transceiver and the control unit according to the status information; and
   a one-way signal transceiver, coupled between the position status detector and the control unit, and transmitting the status information to the control unit in one way,
   wherein the hand-held voice transceiver being held for communication.

2. The voice communication apparatus according to claim 1, further comprising:
   at least a voice transceiver;
   at least a second switch; coupled between said at least one voice transceiver and the control unit, said at least one second switch receiving a control signal transmitted by the control unit to be turned on or cut off according to the control signal; and
   at least an alarm signal generator, coupled to the control unit and transmitting an alarm signal according to the control signal.

3. The voice communication apparatus according to claim 2, wherein said at least one voice transceiver comprises a headset microphone and a hand-free microphone.

4. The voice communication apparatus according to claim 3, wherein said at least one alarm signal generator comprises a first alarm signal generator corresponding to the headset microphone and a second alarm signal generator corresponding to the hand-free microphone.

5. The voice communication apparatus according to claim 4, wherein the first alarm signal generator is a first light emitting diode and/or a first buzzer, and the second alarm signal generator is a second light emitting diode and/or a second buzzer.

6. The voice communication apparatus according to claim 2, wherein said at least one second switch has a first terminal, a second terminal, a third terminal, and a fourth terminal, the first terminal coupled to the voice transceiver, the second terminal floating, and the fourth terminal coupled to the control unit, said at least one second switch further comprising:
   a buffer, an input terminal thereof coupled to the third terminal so as to receive the control signal,
   wherein said at least one second switch determines whether the fourth terminal is coupled to the first terminal or the second terminal according to an output of the buffer.

7. The voice communication apparatus according to claim 2, wherein said at least one second switch has a first terminal, a second terminal, a third terminal, and a fourth terminal, the first terminal coupled to the voice transceiver, the third terminal floating, and the fourth terminal coupled to the control unit, said at least one second switch further comprising:
   a first buffer, an input terminal thereof coupled to the second terminal to receive the control signal;
   a second buffer, an input terminal thereof coupled to an output terminal of the first buffer;
   a first transmitting gate, connected in series between the first terminal and the fourth terminal, a first control terminal of the first transmitting gate coupled to the output terminal of the first buffer, a second control terminal of the first transmitting gate coupled to an output terminal of the second buffer; and
   a second transmitting gate, connected in series between the third terminal and the fourth terminal, a first control terminal of the second transmitting gate coupled to the output terminal of the second buffer, a second control terminal of the second transmitting gate coupled to the output terminal of the first buffer.

8. The voice communication apparatus according to claim 1, wherein the control unit comprises:
   a central processing unit, coupled to the one-way signal transceiver to receive the status information; and
   a voice codec, coupled to the central processing unit and the first switch.

9. The voice communication apparatus according to claim 8, wherein the voice codec receives a voice signal via the first switch and performs coding to the voice signal so as to generate a coded voice signal.

10. The voice communication apparatus according to claim 9, wherein the coded voice signal is a pulse code modulation voice signal.

11. The voice communication apparatus according to claim 1, wherein the position status detector is a hook type switch.

12. The voice communication apparatus according to claim 1, wherein the one-way signal transmitter is a diode, an anode of the diode is coupled to the position status detector and a cathode of the diode is coupled to the control unit.

13. The voice communication apparatus according to claim 1, wherein the first switch has a first terminal, a second terminal, a third terminal, and a fourth terminal, the first terminal is coupled to the hand-held voice transceiver, the second terminal floats, and the fourth terminal is coupled to the control unit, the first switch further comprises:
   a buffer, an input terminal thereof coupled to the third terminal so as to receive the status information,
   wherein the first switch determines whether the fourth terminal is coupled to the first terminal or the second terminal according to an output of the buffer.

14. The voice communication apparatus according to claim 1, wherein the first switch has a first terminal, a second terminal, a third terminal, and a fourth terminal, the first terminal is coupled to the hand-held voice transceiver, the third terminal floats, and the fourth terminal is coupled to the control unit, the first switch further comprises:
- a first buffer, an input terminal thereof coupled to the second terminal so as to receive the status information;
- a second buffer, an input terminal thereof coupled to an output terminal of the first buffer;
- a first transmitting gate, connected in series between the first terminal and the fourth terminal, a first control terminal of the first transmitting gate coupled to an output terminal of the first buffer, a second control terminal of the first transmitting gate coupled to an output terminal of the second buffer; and
- a second transmitting gate, connected in series between the third terminal and the fourth terminal, a first control terminal of the second transmitting gate coupled to an output terminal of the second buffer, a second control terminal of the second transmitting gate coupled to an output terminal of the first buffer.

* * * * *